July 10, 1934.  C. J. HUGHEY  1,966,348
CONTROL FOR A PHOTOGRAPHIC APPARATUS
Filed March 4, 1932  2 Sheets-Sheet 1

Inventor:
Carter J. Hughey,
Newton M. Perrins
George A. Gillette Jr.
By
Attorneys.

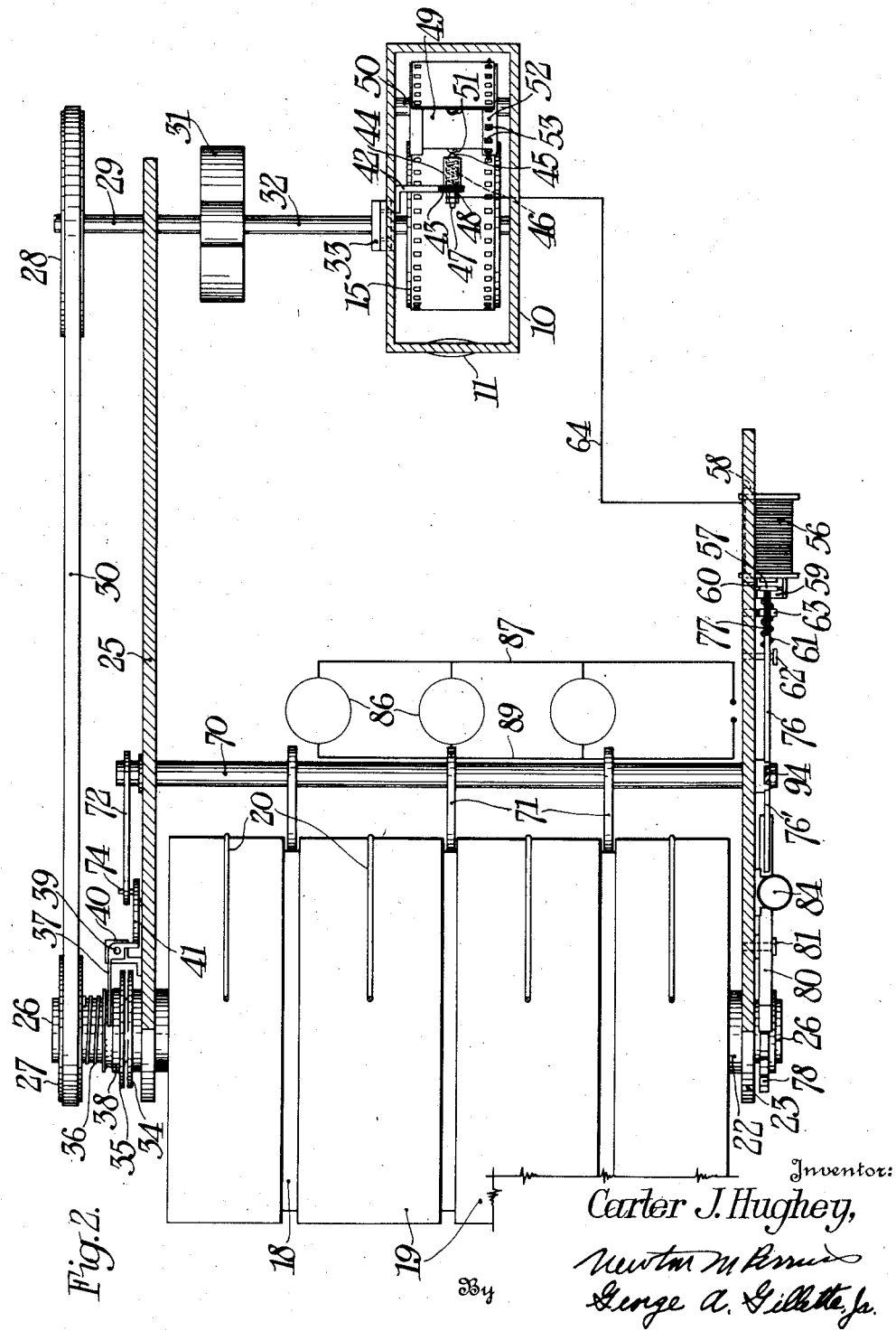

Patented July 10, 1934

1,966,348

UNITED STATES PATENT OFFICE 1,966,348

CONTROL FOR A PHOTOGRAPHIC APPARATUS

Carter J. Hughey, Rochester, N. Y., assignor to Eastman Kodak Company, Rochester, N. Y., a corporation of New York Application March 4, 1932, Serial No. 596,805

15 Claims. (Cl. 88—24)

The present invention relates to a control system for a photographic apparatus, and more particularly to a control system for a photographic apparatus used in reproduction work in which the light-sensitive strip material and documents being reproduced are moved continuously.

In reproduction work with an apparatus in which the documents and light-sensitive material are moved continuously, considerable difficulty is encountered in later examining or viewing the developed images of the documents. If the documents being reproduced have varying dimensions, it is appparent that the viewing device must provide for variable advancement of the developed images therethrough. According to the present invention, each document will be reproduced within an area of a predetermined size or multiple of such an area.

The primary object of the present invention is the provision in photographic apparatus of a control which assures the creation of a latent image on light-sensitive strip material within a predetermined length or multiple thereof.

Another object of the present invention is the provision in a photographic apparatus of a control which halts the advancement of light-sensitive strip material through an exposure position only after a predetermined length of said strip material has passed through said position, irrespective of the continued presence of a document in a photographic field.

A further object of the present invention is the provision in a photographic apparatus of a control which includes a control circuit having two pairs of contacts, an electromagnet, and an armature associated therewith, said electromagnet being energized upon the closure of one pair of contacts to halt the advancement of light-sensitive strip material through an exposure position.

Still another object of the present invention is the provision in a photographic apparatus of an illuminating means for a photographic field and a control means which assures the advancement of a predetermined length of light-sensitive strip material through an exposure position and which simultaneously provides for the energization of the illuminating means.

A still further object of the present invention is the provision in a photographic apparatus of a stop means or pawl and ratchet wheel which are held in or moved out of operative position by a rocker means, the operation of which is determined by a control circuit.

Other and still further objects of the invention will be apparent to those skilled in the art, as the description of the present invention is more fully developed hereinafter.

The above-stated and other objects of the invention are embodied in the combination, of a camera, an advancing means, a feeding means, and a control means. The camera is adapted to contain light-sensitive strip material, such as the well-known 35 mm. motion picture film. The advancing means is adapted to advance the light-sensitive strip material through the camera in a known manner. The feeding means is adapted continuously to move documents to be reproduced through the photographic field of the light-sensitive material which is continuously moving through the camera. The control means supervises the operation of the advancing means and the feeding means so that a predetermined length of light-sensitive material is passed through the exposure position in a camera irrespective of the continued presence of a document in the photographic field. Furthermore, if the document passing through the photographic field is of more than usual length or is too long to be contained on the predetermined length of light-sensitive strip material, then the control means will provide for the continuous passage of 2, 3, or more predetermined lengths through the exposure position of the camera.

Reference is now made to the accompanying drawings in which like reference numerals designate similar elements and in which:

Fig. 2 is a plan view of the photographic apparatus taken on the line 2—2 of Fig. 1.

Figure 1:
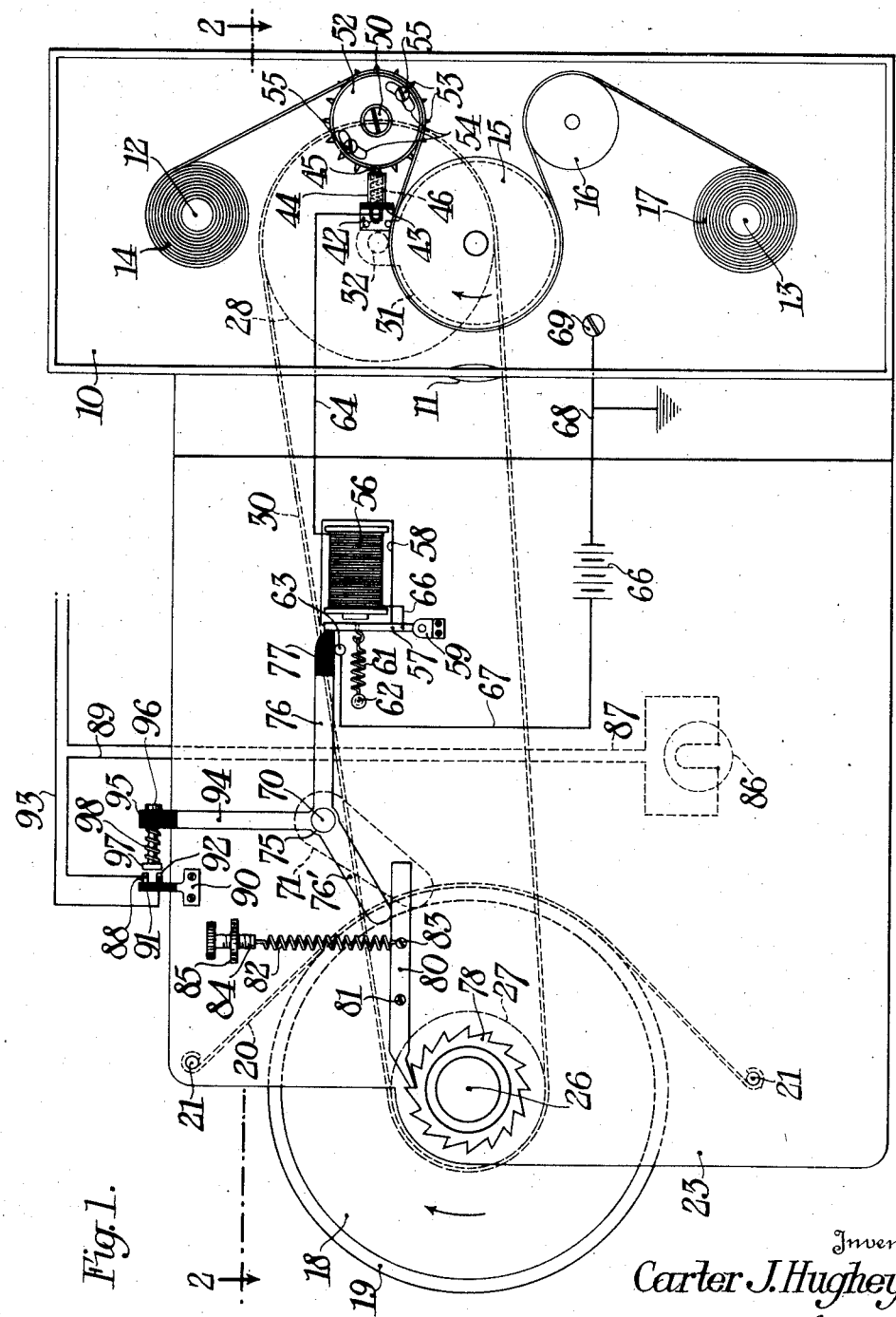
Fig. 1 is a side elevation of the photographic apparatus according to the invention, the cover of the camera being removed for better illustration of the internal parts.

In the illustrated embodiment of the invention, the camera casing 10 is provided with a lens 11 and contains a supply spindle 13 and a take-up spindle 12. A supply roll 17 of light-sensitive strip material is rotatably mounted on supply spindle 13 and is conducted, as clearly shown in Fig. 1, around an idle roll 16, around an advancing roll 15, preferably of rubber, around a toothed means, to the take-up roll 14 of light-sensitive strip material.

The feeding means accomplishes the continuous advancement of the documents to be reproduced through the photographic field of the light-sensitive material in the camera. The feeding means comprises a drum 18 having axially spaced peripheral rings 19 thereon and a plurality of fine wires 20 supported by rods 21 to make peripheral contact with the surfaces of rings 19.

A sleeve 22 supports one end of the drum 18 and is rotatably supported by a side frame 23, while a sleeve 24 on the other end of document 18 is rotatably supported by a side frame 25. The drum 18 is driven in the direction of the arrow shown in Fig. 1 by any suitable prime mover. The peripheral rings 19 on the drum 18 are made of any suitable material of high friction coefficient and having some resiliency. In practice, cork has been found to be a very satisfactory material from which to make rings 19. The advancing means for continuously moving light-sensitive strip material is driven from the feeding means and will now be described.

The advancing means comprises a shaft 26 extending through the center of drum 18, sleeve 22, and sleeve 24, a pulley 27 attached to one end of shaft 26, a pulley 28 affixed to shaft 29, a belt 30 encircling pulleys 27 and 28, a gear box 31 containing reduction gears and a shaft 32 actuating the advancing roll 15 through a detachable connector 33. The advancing means also includes a clutch member having a plate 34 attached to sleeve 24 and a plate 35 slidable upon shaft 26 but compelled to rotate therewith in a known manner by a key and key-way not shown. The clutch plate 35 is normally held in frictional engagement with clutch plate 34 by means of a coil spring 36 which encircles shaft 26 between the pulley 27 and clutch plate 35. A yoke member 37 engages the groove in a collar 38 rotating with clutch plate 35 and imparts axial movement thereto. The yoke member 37 is pivotally mounted by a pin 39 upon a bracket 40 attached to side frame 25. The yoke member 37 is actuated to move collar 38 and clutch plate 35 away from clutch plate 34 against the action of coil spring 36 by means of an eccentric 41 pivotally mounted on side frame 25.

The control means for the advancement of light-sensitive strip material through the camera is made up of two co-related elements, namely, a control circuit including a toothed means and a rocker means. The control means functions to stop the advancing means only after a predetermined length of light-sensitive strip material has passed through the exposure position in the camera. Furthermore, the control means will not permit stoppage of the advancing means if a document is still moving through the photographic field of the feeding means.

The control circuit contains two pairs of contacts which are never more than momentarily closed at the same time. One pair of contacts is located within the camera and is closed periodically each time a predetermined length of light-sensitive strip material passes through the exposure position. One of the contacts of this pair is mounted upon the side of the camera casing 10 by means of a bracket 42 having an insulating portion 43. The contact itself comprises a sleeve 44 containing a ball 45 and coil spring 46. A threaded stem 47 is attached to sleeve 44 and passes through the insulating portion 43 of bracket 42. A nut 48 secures the contact to bracket 42. The other contact of this pair is located upon the freely rotatable toothed means. The toothed means includes a core 49 which is free to rotate upon the axle 50 mounted in the camera casing 10. The core 49 is undercut, as shown in Fig. 2, and is centrally provided with a plurality of contact points 51 which are electrically connected to the camera casing 10 in any suitable manner.

A cap 52 is fitted over one end of core 49, has a plurality of teeth 53 and is provided with a pair of arcuate slots 54. A pair of headed bolts 55 pass through arcuate slots 54 and are threaded into the end of core 49. Thus, it will be noted that the angular relation between teeth 53 and contact points 51 may be altered by unscrewing headed bolts 55, turning cap 52 with respect to core 49, and then tightening headed bolts 55.

The teeth 53 of the toothed means are adapted to engage the perforations in the light-sensitive strip material F which is moved through the camera by the advancing means and one of the contact points 51 is brought into contact with the ball 45 at equal predetermined intervals corresponding to the predetermined length of light-sensitive strip material passing through the exposure position. By way of specific illustration, if sixteen teeth are provided on cap 52 and four contact points 51 are equally spaced around the periphery of core 49, then ball 45 will engage one of contact points 51 each time four perforations of the strip material have passed through the exposure position. The light-sensitive strip material is, for purposes of this illustration, considered to be standard 35 mm. motion picture film which has four perforations to a frame and, therefore, the contacts will be made each time a frame passes through the exposure position.

The control circuit also includes an electromagnet 56 and an armature 57. The electromagnet 56 is mounted upon side frame 23 which is provided with a recess 58 to permit proper location of electromagnet 56. The armature 57 is pivotally mounted upon side frame 23 by means of a bracket 59 but is insulated from side frame 23 by means of an insulating strip 60. A coil spring 61 has one end attached to armature 57 and the other end attached to a pin 62 mounted in side frame 23. The coil spring 61 holds the armature 57 against a contact 63 mounted upon, but insulated from, the side frame 23. One side of electromagnet 56 is connected to the threaded stem 47 of the contact stationarily mounted in the camera casing by means of a conductor 64 while the other side of electromagnet 56 is connected to the armature 57 by a conductor 65. A source of electrical energy, such as a storage battery 66, has one side connected to contact 63 by means of a wire 67 and the other side connected to the camera casing 10 by means of a wire 68 and stud 69, the wire 68 on camera casing 10 being grounded in any suitable manner. The path of the current in the control circuit may now be traced in normal position of armature 57 from battery 66, through wire 67, contact 63, armature 57, conductor 65, electromagnet 56, conductor 64, threaded stem 47, sleeve 44, ball 45, contact point 51, core 49, axle 50, camera casing 10, stud 69, and wire 68, to the other side of the storage battery 66. When ball 45 and one of contact points 51 are in engagement, the circuit is completed and electromagnet 56 is energized, armature 57 is attracted and drawn away from contact 63 to break the circuit.

The rocker means is adapted to assume positions corresponding to the position of the armature 57 and to the location of a bell crank to be later described. A rod 70 is journaled in side frames 23 and 25 in a position parallel to the drum 18. A plurality of fingers 71 are mounted upon rod 70 and are located so that their ends enter the peripheral grooves existing between the annular rings 19 on drum 18. An arm 72, see Fig. 2, is mounted on one end of rod 70 and is provided with a slot which contains a pin 74 on the eccentric 41. When a document enters the feeding means, the fingers 71 will be moved in a clockwise direction, viewed from Fig. 1, arm 72 will turn eccentric 41, yoke member 37 will be moved so that clutch plates 34 and 35 make frictional engagement, shaft 26 will turn with drum 18 and light-sensitive material will be driven through the exposure position of the camera by the advancing means. The diameters of pulleys 27 and 28, and the ratio between the gears in gear box 31, are selected so that the advancement of light-sensitive strip material through the camera is properly timed with respect to the speed at which the document to be reproduced passes through the feeding means. The pulley diameters and the gear ratio will also depend upon the distance between the exposure position of the light-sensitive strip material in the camera and the photographic field in the feeding means, as well as upon the magnification of lens 11. Since lens 11 inverts the document image passing therethrough, the continuous movements of the document through the photographic field and of the light sensitive material through the exposure position must be in opposite directions and therefore drum 18 and advancing roll 15 rotate in the same directions as indicated by the arrows on those elements in Fig. 1.

The rocker means also includes a bell crank 75 which is mounted upon the other end of rod 70. The bell crank 75 has an arm 76 with an insulated end 77 which is adapted to rest upon contact 63. The bell crank 75 also has an arm 76' which is adapted to cooperate with a means adapted to prevent operation of the advancing means. A ratchet wheel 78 is mounted upon shaft 26 and co-operates with a pawl 80 intermediately pivoted to side frame 23 by means of a bolt 81. A coil spring 82 has one end attached to a pin 83 on pawl 80 and the other end swivably mounted upon the end of a thumb screw 84 threaded through a bracket 85 which is mounted on side frame 23. Thus, when the rod 70 is turned as previously described, by the entrance of a document into the photographic field, bell crank 75 is also turned so that arm 76' moves pawl 80 out of engagement with the ratchet wheel 78. The advancing means is now free to operate and is actually driven through the clutch member in the manner already set forth.

Upon rotation, rod 70 raises arm 76 and its insulated end 77 so that coil spring 61 draws armature 57 into a normal position against contact 63. In this normal position of armature 57, the bell crank 75 is prevented from returning to its normal position and is blocked in such operative position with the pawl 80 out of engagement with ratchet wheel 78. This blocking of the bell crank 75 in operative position will continue even after the document has left the photographic field and until the control circuit is closed by engagement of ball 45 with one of contact points 51 to energize electromagnet 56 and draw armature 57 into attracted position. The coil spring 82 now acts to move pawl 80 into the path of ratchet wheel 78, to return bell crank 75 to normal position and to move fingers 71 into the grooves between annular rings 19 on drum 18. This return of the rocker means to normal position prevents further operation of the advancing means and also releases the drive for the advancing means by disengagement of clutch plates 34 and 35.

An illuminating means is provided within the photographic apparatus for proper illumination of the document in the photographic field. The illumination of the photographic field need, of course, only take place during the advancement of light-sensitive strip material through the exposure position. According to the present invention, the illuminating means is energized and de-energized corresponding to the position of the rocker means in a manner now to be described. A plurality of light sources, such as incandescent lamps 86, are located so as to properly illuminate the surfaces of annular rings 19. One side of the lamps 86 is connected to a source of electrical energy by means of a conductor 87, while the other side of lamps 86 is connected to a contact post 88 by means of a conductor 89. A bracket 90 is mounted upon side frame 23 and has an insulated portion 91 for support of contact post 88 and also for support of a second contact post 92, which is connected to the source of electrical energy by a conductor 93. An upright arm 94 is integral with bell crank 75 and carries an insulated end 95. A headed stud 96 extends through insulated end 95 of arm 94 and carries a contactor 97. A coil spring 98 encircles stud 96 between contactor 97 and insulated end 95, so that contactor 97 is resiliently held in extended position. The contactor 96 is located with respect to contact posts 88 and 92 so that upon movement of the rocker means and bell crank 75 into operative position, the contact posts 88 and 92 are electrically connected by contactor 97 to place the incandescent lamps 86 across the source of electrical energy. Upon return of the rocker means or bell crank 75 to normal position, the connection between contact posts 88 and 92 is interrupted and the incandescent lamps 86 extinguished.

A cycle of operations for the photographic apparatus according to the invention will now be described. In the first instance, the drum 18 and annular rings 19 are continuously rotating. The document to be photographed or reproduced is introduced into the feeding means between the peripheries of rings 19 and wires 20. This introduction of the document into the feeding means moves the rocker means into operative position and bell crank 75 is rotated in clockwise direction so that pawl 80 is moved out of engagement with ratchet wheel 78 and arm 76 is raised to allow armature 57 to assume a normal position against contact 63. At the same time, clutch plates 34 and 35 are brought into engagement and the movement of light-sensitive strip material through the exposure position of the camera is started.

The rocker means and bell crank 75 will be held in operative position even after the document leaves the feeding means because armature 57 in normal position blocks the arm 76 of the bell crank in raised or operative position and prevents the pawl 80 from returning to engagement with ratchet wheel 78. If, however, the document has left the feeding means and the toothed means has rotated sufficiently so that one of the contact points 51 engages ball 45 to complete the circuit through the control circuit, then electromagnet 56 is energized, armature 57 is drawn into attracted position, the rocker means is returned to normal position by the coil spring 82 and pawl 80 interrupts further movement of the advancing means by engaging ratchet wheel 78. It should be noted that the connection between contact 63 and armature 57 is broken as soon as ball 45 engages one of the contact points 51 so that the battery 66 is only momentarily loaded at any time.

If the document should be of a length such that its image on the strip material is longer than the length predetermined, then, upon engagement of ball 45 with the first contact 51 to approach it, electromagnet 56 will be energized to move armature 51 into attracted position, but since the document is still in the feeding means, the rocker means is maintained in operative position by it and when the contact between wall 45 and contact point 51 is broken, the coil spring 61 will again draw armature 57 into normal position, since the armature 57 is not blocked by the insulated end 77 of arm 76.

In view of this last-mentioned possibility, it will be understood that the predetermined length of light-sensitive strip material, as called for in the appended claims, includes any unit predetermined length or multiple thereof. The only limitation is that the multiple must be an integer, so that subsequent viewing of the strip material will be facilitated by the provision of a viewing device having an advancing means or pull-down mechanism for moving the strip material intermittently with a stroke equal to the predetermined length.

Since many modifications of the invention will be evident or suggested to those skilled in the art, the present disclosure is to be construed in an illustrative, and not in a limiting sense.

Having now particularly described my invention, what I desire to secure by Letters Patent of the United States and what I claim is:

1. In a photographic apparatus, the combination with a camera having an exposure position and a photographic field, an advancing means adapted continuously to move light sensitive strip material through said exposure position, and a feeding means adapted continuously to move a document through said photographic field, of a control means including two elements which are adapted to cooperate and which are only simultaneously effective to stop said advancing means, one of said elements being rendered effective periodically, and the other of said elements being movable to an effective position upon the exit of a document from said feeding means.

2. In a photographic apparatus, the combination with a camera having an exposure position and a photographic field, an advancing means adapted continuously to move light sensitive strip material through said exposure position, and a feeding means adapted continuously to move a document through said photographic field, of a control means including two elements which are adapted to cooperate and which are only simultaneously effective to stop said advancing means, one of said elements being periodically rendered effective by the advancing means upon the advancement of a predetermined length of light sensitive strip material, and the other of said elements being movable to an effective position but maintained in ineffective position by a document in said feeding means.

3. In a photographic apparatus, the combination with a camera having an exposure position and a photographic field, an advancing means adapted continuously to move light sensitive strip material through said exposure position, and a feeding means adapted continuously to move a document through said photographic field, of a control means including two elements which are adapted to cooperate and which are only simultaneously effective to stop said advancing means, one of said elements being regularly and intermittently rendered effective by the advancing means upon the advancement of a predetermined length of light sensitive material, and the other of said elements being biased to an effective position but maintained in ineffective position by a document in said feeding means.

4. In a photographic apparatus, the combination with a camera having an exposure position and a photographic field, an advancing means adapted continuously to move light sensitive strip material through said exposure position, and a feeding means adapted continuously to move a document through said photographic field, of a control means normally inoperative, adapted to be rendered operative by the entrance of a document into said photographic field, maintained operative after said document leaves said photographic field, then rendered inoperative and adapted to stop said advancing means only after a predetermined length of light sensitive strip material has passed through said exposure position.

5. In a photographic apparatus, the combination with a camera having an exposure position and a photographic field, and advancing means adapted continuously to move light sensitive strip material through said exposure position, and a feeding means adapted continuously to move a document through said photographic field and including a clutch member normally disengaged and adapted upon engagement to drive said advancing means, of a control means adapted to cause engagement of said clutch member upon the entrance of a document into said photographic field and adapted to maintain engagement of said clutch member until a predetermined length of light sensitive strip material has moved through the exposure position, irrespective of the continued presence of a document in said photographic field.

6. In a photographic apparatus, the combination with a camera having an exposure position and a photographic field, an advancing means adapted continuously to move light sensitive strip material through said exposure position, and a feeding means adapted continuously to move a document through said photographic field and including a clutch member normally disengaged and adapted upon engagement to drive said advancing means, of a control means including a lever means adapted to cause engagement of said clutch member and including an electro-mechanical means adapted to maintain engagement of said clutch member until a predetermined length of light sensitive strip material has passed through the exposure position.

7. In a photographic apparatus, the combination with a camera having an exposure position and a photographic field, an advancing means adapted continuously to move light sensitive strip material through said exposure position, and a feeding means adapted continuously to move a document through said photographic field and an illuminating means adapted to illuminate the photographic field, of a control means normally inoperative, adapted to be rendered operative by the presence of a document in said photographic field, adapted to cause energization of said illuminating means and adapted to stop said advancing means and to de-energize said illuminating means only after a predetermined length of light sensitive strip material has passed through said exposure position.

8. In a photographic apparatus, the combination with a camera adapted to contain light sensitive strip material and an advancing means adapted continuously to move light sensitive strip material through said camera and including a clutch member, of a control circuit including a pair of contacts and an electro-magnet said contacts being closed and said electro-magnet being energized upon the passage of a predetermined length of light sensitive material through said camera, and a rocker means cooperating with said electro-magnet and adapted upon energization thereof to disengage said clutch member and stop said advancing means.

9. In a photographic apparatus, the combination with a camera adapted to contain light sensitive strip material and an advancing means adapted to continuously move light sensitive strip material through said camera and including a clutch member, of a control circuit including a pair of contacts, an electro-magnet, an armature and a source of electrical energy, said contacts being closed and said electro-magnet being energized to attract said armature upon the passage of a predetermined length of light sensitive strip material through said camera, and a rocker means actuated upon energization of said electro-magnet to disengage said clutch member and stop said advancing means.

10. In a photographic apparatus, the combination with a camera having an exposure position and a photographic field, a feeding means adapted continuously to move a document through said photographic field and an advancing means adapted continuously to move light sensitive strip material through said exposure position, of a control circuit including a pair of contacts, an electro-magnet and an armature forming one of a second pair of contacts and adapted to assume a normal position and an attracted position, and a rocker means movable into a normal position and adapted to assume an operative position upon entrance of a document into said photographic field, said second pair of contacts being closed in normal position of said armature and operative position of said rocker means, and said first mentioned pair of contacts being closed to stop said advancing means upon the passage of a predetermined length of light sensitive material therethrough.

11. In a photographic apparatus, the combination with a camera having an exposure position and a photographic field, a feeding means adapted continuously to move a document through said photographic field and an advancing means adapted continuously to move light sensitive strip material through said exposure position, of a control circuit including a pair of contacts adapted to be closed periodically upon the passage of a predetermined length of light sensitive strip material through said exposure position, an electro-magnet and an armature forming one of a second pair of contacts and adapted to assume a normal position and an attracted position, and a rocker means including a bell crank movable into a normal position in which said armature is held in attracted position and adapted to assume an operative position in which said armature is free to move into either position, said second pair of contacts being normally closed and being broken upon closure of said first mentioned pair of contacts.

12. In a photographic apparatus, the combination with a camera having an exposure position and a photographic field, a feeding means adapted continuously to move a document through said photographic field and an advancing means adapted continuously to move light sensitive strip material through said exposure position, of a control circuit including a pair of contacts adapted to be closed periodically upon the passage of a predetermined length of light sensitive strip material through said exposure position, an electro-magnet and an armature having a normal position and an attracted position, a rocker means including a bell crank having a normal position and an operative position, and including a means adapted to prevent operation of said advancing means during normal position of said bell crank, said bell crank being held in operative position by said armature in normal position until said electro-magnet is energized through said pair of contacts whereby the advancing means continues to operate after the document has left the photographic field and until said predetermined length of light sensitive material has passed through the exposure position.

13. In a photographic apparatus, the combination with a camera having an exposure position and a photographic field, a feeding means adapted continuously to move a document through said photographic field and an advancing means adapted continuously to move light sensitive strip material through said exposure position, of a control circuit including a pair of contacts adapted to be closed periodically upon the passage of a predetermined length of light sensitive strip material through said exposure position, an electro-magnet and an armature having a normal position and an attracted position, and a rocker means including a bell crank having a normal position and adapted to be moved into an operative position by the entrance of a document into the photographic field, said armature being adapted to maintain said bell crank in operative position until energization of said electro-magnet and then to block said armature in attracted position until another document enters said photographic field.

14. In a photographic apparatus, the combination with a camera having an exposure position and a photographic field, a feeding means adapted continuously to move a document through said photographic field and an advancing means adapted continuously to move light sensitive strip material through said exposure position, of a control circuit including a pair of contacts, an electro-magnet and an armature adapted to be attracted thereby, a rocker means cooperating with said armature and adapted to stop said advancing means, and a toothed means adapted to be rotated by said light sensitive strip material and carrying one of said pair of contacts which engages the other contact at equal predetermined intervals corresponding to the passage of a predetermined length of light sensitive strip material through the exposure position.

15. In a photographic apparatus, the combination with a camera having an exposure position and a photographic field, a feeding means adapted continuously to move a document through said photographic field and an advancing means adapted continuously to move light sensitive strip material through said exposure position, of a control circuit including a pair of contacts, an electro-magnet and an armature adapted to be attracted thereby, a rocker means cooperating with said armature and adapted to stop said advancing means, a rotatable core carrying one of said pair of contacts which engages the other contacts at predetermined equal intervals corresponding to the passage of a predetermined length of light sensitive strip material through the exposure position and a cap rotatably adjustable with respect to said core, and having teeth adapted to engage said light sensitive strip material whereby the position of the predetermined length of light sensitive strip material may be altered thereon.

CARTER J. HUGHEY.